United States Patent
Dannenberg

(10) Patent No.: US 9,314,137 B2
(45) Date of Patent: Apr. 19, 2016

(54) SMART MULTI-SOAP DISPENSER

(71) Applicant: Airbus Operations GmbH, Hamburg (DE)

(72) Inventor: Andreas Dannenberg, Neu Wulmstorf (DE)

(73) Assignee: Airbus Operations GmbH (DE)

( * ) Notice: Subject to any disclaimer, the term of this patent is extended or adjusted under 35 U.S.C. 154(b) by 26 days.

(21) Appl. No.: 13/957,545

(22) Filed: Aug. 2, 2013

(65) Prior Publication Data

US 2014/0042184 A1 Feb. 13, 2014

Related U.S. Application Data

(60) Provisional application No. 61/680,312, filed on Aug. 7, 2012.

(30) Foreign Application Priority Data

Aug. 7, 2012 (EP) ...................................... 12179563

(51) Int. Cl.
*B67D 7/14* (2010.01)
*A47K 5/12* (2006.01)
*E03C 1/05* (2006.01)
*G05D 11/13* (2006.01)
*B01F 15/04* (2006.01)

(52) U.S. Cl.
CPC ................. *A47K 5/1217* (2013.01); *E03C 1/05* (2013.01); *A47K 2210/00* (2013.01); *B01F 15/0404* (2013.01); *B01F 15/0441* (2013.01); *B67D 7/14* (2013.01); *G05D 11/131* (2013.01); *G05D 11/135* (2013.01); *G05D 11/139* (2013.01)

(58) Field of Classification Search
CPC ........ B67D 1/00; B67D 7/14; B01F 15/0441; B01F 15/0404; G05D 11/131–11/132; G05D 11/135; G05D 11/139
USPC ............... 222/23, 56–58, 61–64, 77; 700/231
See application file for complete search history.

(56) References Cited

U.S. PATENT DOCUMENTS 4,515,292 A * 5/1985 Koos, Jr. ........................ 399/58
4,955,507 A * 9/1990 Kirschner et al. .............. 222/63

(Continued)

FOREIGN PATENT DOCUMENTS

| EP | 1 683 456 A1 | 7/2006 |
| WO | 93/10311 A1 | 5/1993 |
| WO | 02/29168 A1 | 4/2002 |

*Primary Examiner* — Kevin P Shaver
*Assistant Examiner* — Andrew P Bainbridge
(74) *Attorney, Agent, or Firm* — Lerner, David, Littenberg, Krumholz & Mentlik, LLP

(57) ABSTRACT

A water amount controlling device includes a control unit for controlling an amount of water to be supplied, and a washing agent receptacle including a detection unit, wherein the detecting unit is adapted for detecting and identifying e.g. a type, a consistency or an amount of washing agent dispensed from a washing agent reservoir to be received in the washing agent receptacle, and wherein the control unit is adapted for controlling an amount of water based on the detected and identified property of the quantity of washing agent.

14 Claims, 2 Drawing Sheets

(56) References Cited

U.S. PATENT DOCUMENTS

| | | | |
|---|---|---|---|
| 5,040,699 A * | 8/1991 | Gangemi | 222/1 |
| 5,842,603 A * | 12/1998 | Schroeder et al. | 222/23 |
| 6,148,717 A * | 11/2000 | Lassota | A47J 31/002 222/1 |
| 6,435,375 B2 * | 8/2002 | Durham et al. | 222/129.1 |
| 7,107,631 B2 * | 9/2006 | Lang et al. | 4/623 |
| 7,537,138 B2 * | 5/2009 | Saggin | A47J 31/002 222/1 |
| 7,628,293 B2 * | 12/2009 | Urata et al. | 222/58 |
| 7,634,367 B1 * | 12/2009 | Ding et al. | 702/50 |
| 8,333,301 B2 * | 12/2012 | Doglioni Majer | A47J 31/401 141/104 |
| 8,424,572 B2 * | 4/2013 | Fu | G05D 11/134 141/100 |
| 2006/0115570 A1 * | 6/2006 | Guerrero | B67D 1/0027 426/590 |
| 2006/0115572 A1 * | 6/2006 | Guerrero | A47J 31/402 426/597 |
| 2012/0067920 A1 * | 3/2012 | Veltrop et al. | 222/1 |

* cited by examiner

SMART MULTI-SOAP DISPENSER

CROSS-REFERENCE TO RELATED APPLICATIONS

This application claims the benefit of the filing date of European Patent Application No. 12 179 563.7 filed Aug. 7, 2012 and of U.S. Provisional Patent Application No. 61/680, 312 filed Aug. 7, 2012, the disclosure of which applications is hereby incorporated herein by reference.

FIELD OF THE INVENTION

The present invention relates to a soap dispensing device, and in particular to a soap dispensing device which is capable of controlling a water amount based on a dispensed washing agent dispensed from a washing agent reservoir.

BACKGROUND OF THE INVENTION

Present soap dispensers within commercial passenger aircraft are designed as liquid soap dispensers without any communication possibilities to a water faucet and their regulation. Thus, the dispensed amount of water from the water faucet does not relate to the dispensed soap, so that no water amount adaption takes place. Therefore, in general a uniform preselected amount of water is dispensed regardless the type of soap, the consistency of soap, the amount of soap or the like.

BRIEF SUMMARY OF THE INVENTION

It would be desirable to provide an improved water dispensing device and water amount controlling device, respectively, allowing a controlled dispensing of water based on a dispensed washing agent.

An embodiment of the invention provides a device for controlling a water amount as well as an aircraft hand washing device and a corresponding program element and computer readable medium.

It should be noted that the following described exemplary embodiments of the invention apply also for the water amount controlling device as well as the aircraft hand washing device, a possible program element, and a computer readable medium having stored the program element, wherein the program element includes instructions for controlling a water amount.

According to an exemplary embodiment, a water amount controlling device comprises a controlling unit for controlling an amount of water to be supplied, a washing agent receptacle including a detection unit, wherein the detecting unit is adapted for detecting and identifying a property of a quantity of washing agent dispensed from a washing agent reservoir to be received in the washing agent receptacle, wherein the control unit is adapted for controlling an amount of water based on the detected and identified property of the quantity of washing agent.

Thus, it is possible to control the amount of water based on a dispensed washing agent, for example hand wash soap. It should be noted that the property of a quantity of washing agent may be for example an amount of washing agent, which may be determined based on a volume or a weight, a consistency of the washing agent, or any other property which may be of relevance for determining a required amount of water for washing purposes. It should be noted, that the term "quantity" means an undetermined amount of washing agent. The term "amount" means for example a particular volume of a washing agent, a particular weight of a washing agent, or any other measure for a washing agent. An above described water amount controlling device allows to adapt the dispensed water amount to for example a volume or a particular weight or a dispensed amount of washing agent, considering for example also the consistency of the washing agent. Thus, the dispensed amount of water may be adapted according to need. Therefore in general a reduction of the dispensed water may be achieved, as no second or further preselected dispensing amount of water will be dispensed. In particular in aircraft, it may be of particular relevance to reduce the water consumption, as water constitutes a certain weight which should be reduced for energy saving purposes. If adapting the dispensed amount of water based on for example a type of washing agent, an amount of washing agent or the consistency of washing agent, or any combination thereof, only that amount of water may be dispensed which is determined to be necessary for that particular type, amount and/or consistency of washing agent. The adapted amount of water also may lead to a reduced energy consumption, as less water is to be heated. In addition, it is possible to reduce the time per passenger within the lavatory. Further, it may increase the flexibility at the operator daily life regarding different business models and aircraft uses.

According to an exemplary embodiment of the invention, the water amount controlling device further comprises a dispensing unit, wherein the washing agent receptacle is adapted for receiving a washing agent container, wherein the dispensing unit is adapted for dispensing an amount of a washing agent out of a received washing agent container upon user request.

Thus, it is possible to provide a dispensing unit, so that the water amount controlling device allows a user action so that the user may receive a washing agent like for example soap upon request. The water amount controlling device detects and identifies for example a type, an amount and/or consistency of washing agent or soap and may determine the proper amount of water which is necessary to wash for example hands in combination with the dispensed amount of washing agent. It should be noted that the amount of water may include a particular additional amount of water, so that the total amount of water for a particular percentage of users may be sufficient for washing, for example hand washing. The additional amount of water may be determined based on an experience and statistical data.

According to an exemplary embodiment, the detection unit of the water amount controlling device is adapted for detecting and identifying a consistency of a dispensed washing agent, wherein the wherein the control unit is adapted to control the amount of water based thereon.

Thus, it is possible to detect for example a consistency of the soap in form of foam, which for example may require less water than a liquid soap. Thus, the property of a quantity of washing agent may be the consistency as well as a volume or a weight of the dispensed washing agent. The water amount controlling device may have a lookup table or an algorithm included considering the different properties of a quantity of washing agent to arrive at the proper water amount to be dispensed.

According to an exemplary embodiment, the detection unit of the water amount controlling device is adapted for detecting and identifying an amount of a dispensed washing agent, wherein the control unit is adapted to control the amount of water based thereon.

Thus, not only the consistency, but also an amount of dispensed washing agent may be considered for determining a proper water amount to be dispensed. The amount may be determined based on weight and/or volume.

According to an exemplary embodiment, the detection unit of the water amount controlling device is adapted for detecting and identifying a flow of a dispensed washing agent, wherein the control unit is adapted to control the amount of water based thereon.

Thus, the amount of dispensed washing agent may be detected and identified based on a flow of either a liquid or foam. The washing agent may be present in a washing agent container in form of foam or in form of a liquid. It should be noted that even if the washing agent in the container is a liquid, a foam generator may be provided so that the liquid washing agent will be transformed into foam which may be dispensed. The flow detector may determine the flow before or behind the foam generator in form of a liquid or foam, respectively.

According to an exemplary embodiment, the detection unit of the water amount controlling device is adapted for detecting mechanical properties of a washing agent container to be received in the receptacle, wherein the mechanical properties being unique for a property of the washing agent in the washing agent container.

Thus, mechanical properties may be used for identifying the washing agent. Mechanical properties may be for example a particular recess pattern, a particular protrusion pattern, a particular form of the agent container, or any other mechanical property, which may be detected by the detection unit. For example, a particular pattern may be unique for a particular washing agent, for example a foam agent, wherein another mechanical property may be unique for a liquid or fluid washing agent. Thus, the water amount controlling device may determine the required amount of water based on the determined mechanical property of the agent container representing e.g. a particular type of washing agent. It should be noted that the determined mechanical property may be used in combination with the determined property of a washing agent to determine a required water amount. The mechanical properties may be for example unique for a particular manufacturer of washing agent, wherein different washing agents from different manufacturers may require different amounts of water for e.g. hand washing.

According to an exemplary embodiment, the detection device of the water amount controlling device is further adapted for detecting an electronic identifier of a washing agent container to be received in the receptacle.

Thus, the washing agent container may have an electronic identifier, like for example an RFID, so that the washing agent and/or the manufacturer, and therefore the properties of the washing agent may be identified by way of the electronic identifier.

According to an exemplary embodiment, the detection device of the water amount controlling device is adapted for detecting a weight of a washing agent container to be received in the receptacle for identifying a washing agent container or identifying the fill level thereof.

Thus, also a weight as a characteristic for a manufacturer or of the consistency of the washing agent may be detected, so that the amount of water may be determined based thereon. It should be noted that the mechanical properties, an electronic identifier, or for example an optical identifier may be used alone or in combination to identify a particular washing agent container to distinguish between several manufacturers, several properties of the washing agent, or for example the consistency of the washing agent within the container. In particular when using the weight, the detection device may be adapted to check whether a full container was received in the receptacle by detecting for example a seal, so that the weight may serve as a characteristic for the consistency.

According to an exemplary embodiment, the detection device of the water amount controlling device is adapted for detecting a fill level of a washing agent container to be received in the washing agent receptacle.

Thus, the water amount controlling device may report a possible need of exchange of a container in the near future in due time.

According to an exemplary embodiment, the water amount controlling device further comprises an interface to a cabin management system of an aircraft for providing information on a fill level of the washing agent container to be received in the washing agent receptacle for maintenance and/or service purposes.

Thus, it is possible to report the fill level of the washing agent container to a cabin management system, so that a cabin attendant may refill the washing agent container in due time or the washing agent container may be refilled or replaced during a ground service.

According to an exemplary embodiment, an aircraft hand washing device comprises a water amount controlling device as described above, a water faucet, and a water controlling valve, wherein the control unit is adapted for controlling the water controlling valve so as to control an amount of water supplied by the water faucet.

Thus, not only a water amount controlling device, but also an entire aircraft hand washing device including a water faucet and a water controlling valve may be provided. The water faucet as well as the water controlling valve may be particularly adapted for a communication and an interaction with the water amount controlling device.

According to an exemplary embodiment, the water amount controlling device of the aircraft hand washing device is adapted to control an opening cycle of the water controlling valve with respect to at least one of the opening grade and the opening duration of the water controlling valve.

Thus, the water amount may be controlled by selecting a particular opening grade. Alternatively or in addition thereto, the water may be controlled by selecting an opening duration of the water controlling valve. It should be noted that the opening duration may also be a particular pattern of valve opening. Thus, the water controlling valve may for example open for a first particular amount of time for providing an additional amount of water for better mixing of the washing agent being already dispensed e.g. on the user's hand for hand washing, wherein a delayed second opening duration provides a particular amount of water for washing the washing agent away after hand washing to clear-wash for example the user's hands. Thus, the opening duration may include an opening pattern.

According to an exemplary embodiment, the water amount controlling device of the aircraft hand washing device is adapted to control a water pressure of the water to be supplied to the water faucet.

Thus, the pressure of water being dispensed from the water faucet may be adapted according to for example the consistency or the amount of washing agent being dispensed.

According to an exemplary embodiment, the water amount controlling device of the aircraft hand washing device is adapted to control a flow cross section of the water controlling valve for controlling the water pressure of the water to be supplied to the water faucet.

Thus, the water may be controlled by adapting an opening cross section of the water faucet or the water controlling valve. For example, an arrangement of two parallel punched discs may be rotated with respect to each other, so as to bring the particular punchings of the discs into correspondence to each other, so that a number of corresponding punches or holes in the disc may be used for controlling the dispensed amount of water.

According to an exemplary embodiment, there is provided a programme element having included instructions for operating the controlling unit for controlling an amount of water to be supplied based on the property of a quantity of washing agent dispensed from a washing agent reservoir to be received in the washing agent receptacle.

According to an exemplary embodiment, there is provided a computer readable medium having stored thereon the above programme element. It should be noted that the above features may also be combined. The combination of the above features may also lead to synergetic effects, even if not explicitly described in detail.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to following drawings.

DETAILED DESCRIPTION

Potable water within current commercial passenger aircrafts will be used to supply consumer with water in a lavatory, galley, shower, humidifier, etc. The water in the lavatory will be used for the toilette as well as the water faucet supply. The water via the faucet will be used for face washing, for refreshment, hand washing, teeth brushing, hair combing, and/or cloth cleaning. Very often, the soap from the wash table integrated soap dispenser will be used to support the cleaning function. The water amount controlling device and the aircraft hand washing device described in the following provide the possibility to use different kinds of soaps or other washing agents, wherein the consistency of the soap may be foam or a liquid. The water amount controlling device and the aircraft hand washing device described in the following are capable of receiving a washing agent container within a receptacle, wherein the water amount controlling device is capable of determining the properties of the dispensed washing agent so as to determine a proper amount of water to be dispensed from a water faucet. Having installed the water amount controlling device according to the following description, no further adaption of the architecture and equipment around and within for example the lavatory may be necessary for using different variants of soap or washing agent. As it may be necessary to know the consistency of the soap to regulate the faucet and to reduce the water, it may be also necessary to identify or detect the used soap after installation of the soap or washing agent container. This detection can be arranged in different ways. The soap tank can have for example an electronic chip or can be designed in a different way, so that the dispenser can for example identify the soap consistency. As an alternative, the soap dispenser or in general the water amount controlling device or the aircraft hand washing device may have a consistency check via flow detection. After identification of for example the washing agent consistency, a water faucet will be controlled and regulated. This may happen for example with use of the data base or a calculation of for example washing agent consistency or any other property versus a water demand per wash cycle. An adaption may take place of the flow rate or an open cycle per use of the water faucet. As the operator may choose different kinds of soap or washing agents for different applications, like for example business models, aircraft use, and so on, a higher flexibility of the daily operation may be achieved by using the herein described water amount controlling device and aircraft hand washing device.

Figure 1:
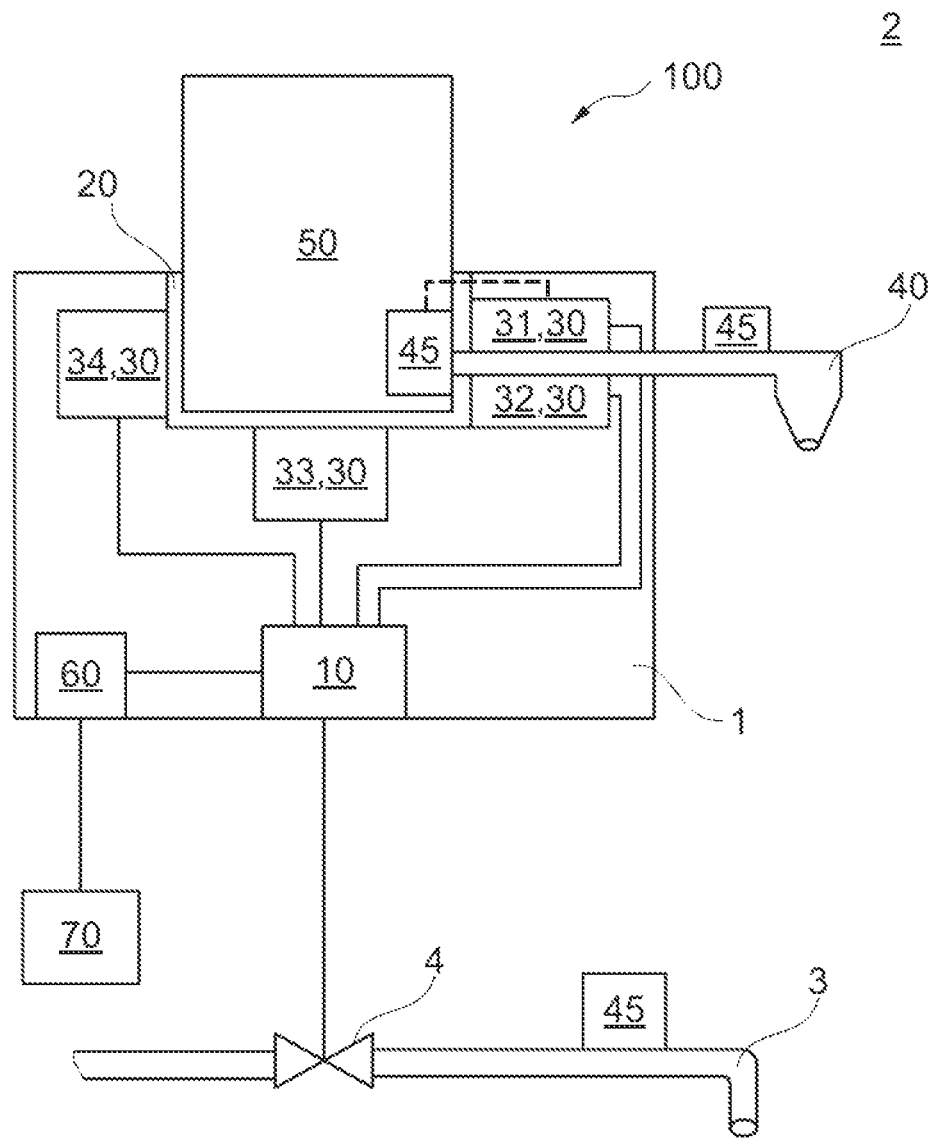
FIG. 1 illustrates a schematic overview on a water amount controlling device as well as an aircraft hand washing device according to an exemplary embodiment.

FIG. 1 illustrates a schematic overview of a water amount controlling device and an aircraft hand washing device. The water amount controlling device 1 of an aircraft 2 may have a control unit 10 and a washing agent receptacle 20. The washing agent receptacle 20 is adapted to receive a washing agent container 50. The washing agent container 50 may include different types of soap. The water amount controlling device 1 includes one or more detection units 30, 31, 32, 33, 34 being able to detect properties of the washing agent including the consistency, the type of washing agent, and an amount of washing agent, respectively. The water amount controlling device 1 may have for example a consistency detector 31 as detection unit 30. The consistency detector may for example detect the consistency of a washing agent. The consistency of the washing agent may for example vary from liquid, high viscosity and low viscosity, to very light foam. The consistency detector for example may detect the consistency or the density of the foam or the washing agent, so as to allow a determination of a required amount of water to be dispensed from the water faucet 3. The consistency detector may have for example an optical detector, or an ultrasonic detector to detect the properties of the washing agent. It should be noted that the washing agent container 50, as well as the dispensing unit 40, as well as the water faucet or any other unit may have a consistency selector 45, to that the user may select a consistency. It should be noted that also the operator may select or preselect a consistency of the washing agent to be dispensed. In particular, the consistency selector may feedback the selected consistency with the consistency detector, so that the consistency detector may for example verify the consistency being already detected by the consistency selector 45.

Alternatively or additionally the detection unit 30 may further include an amount detector and/or a flow detector 32. The amount detector and/or the flow detector may determine an amount of washing agent, so that the required amount of water to be dispensed from the water faucet 3 may be controlled based thereon. It should be noted that the amount of water may be determined also based on a combination of the determined consistency as well as the determined amount of washing agent. The detected signal from the consistency detector as well as the amount detector or flow detector may be fed to the control unit 10. In addition or alternatively, the water amount controlling device may have a fill level detector and/or weight detector. The weight detector may for example be used for identifying a particular kind of washing agent within the container. Given, that the washing agent in the container is for example in the consistency of foam, the washing agent container is somewhat lighter than the same volume washing agent container containing a liquid soap. Thus, the weight detector may be used for identifying for example the consistency of a washing agent within a container. However, the weight detector as well a fill level detector may be used for determining the remaining amount of washing agent within the washing agent container 50. The fill level or the weight may be fed with to the control unit 10, so that the control unit may provide particular information with an interface 60 to inform a cabin management system 70. The water amount controlling device 1 may further have a type identification unit 34 as a detection unit 30. The type identification unit may be used for example for identifying a certain manufacturer or a certain type of a washing agent. The type identification may take place by way of determining a mechanical property, an electronic identifier, or an optical identifier, as will be described in the following with respect to FIG. 2.

An aircraft hand washing device 100 may have a water amount controlling device 1 as described above, as well as a water faucet 3 and a water controlling valve 4. The control unit 10 may send a controlling signal to the water controlling valve 4 so as to control an amount of water to be dispensed from the water faucet 3.

Figure 2:
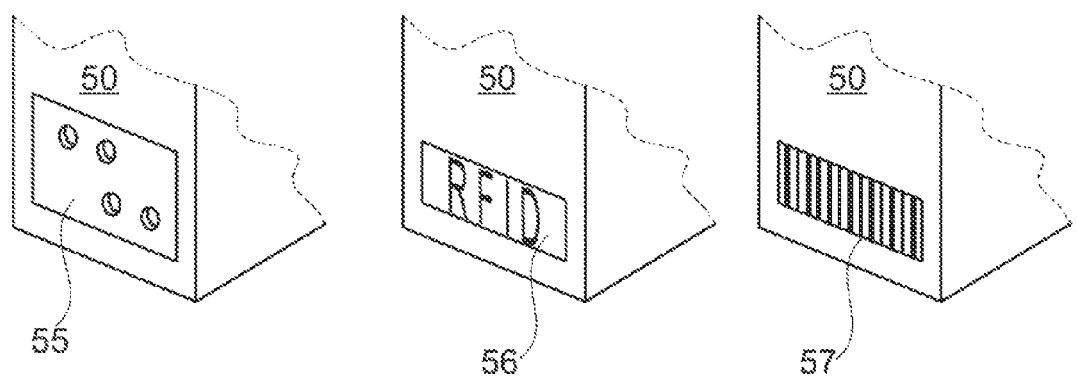
FIG. 2 illustrates different kinds of identifiers of a washing agent container.

FIG. 2 illustrates a variety of identifiers being disposed on a washing agent container 50. The identifier may be in a position corresponding to the type identification unit 34 of the water amount controlling device 1, when the washing agent container 50 will be received within the washing agent receptacle 20. The mechanical identifier 55 may have a mechanical property, like for example a particular hole or recess pattern. A particular pattern may be detected or scanned by the type identification unit. The identification may take place via for example a mechanical sensing unit, like for example a plurality of pins engaging the recesses, so as to detect the recess pattern. As an alternative, the recess pattern may also be detected by way of an optical identification unit, as the type identification unit 34. As an alternative, an electronic identifier 56 may be provided, for example in form of an RFID. In this case, the type identification unit is adapted to read the RFID, so as to receive information on the washing agent contained in the washing agent container 50. As a further alternative, the washing agent container 50 may have an optical identifier 57, for example a bar code or any other optical identifier, so as the washing agent container may be identified by an optical reader as the type identification unit 34 of the water amount controlling device.

It should be noted, that an electronic identifier may also be included somewhere in the washing agent container, as the detection may be possible within a certain range of distance. In general, the detection of the type of soap, for example the soap consistency may be carried out via an electronic chip on or in the soap tank, a mechanical differentiation of the soap tank, a weight difference of the soap tank, or a flow detection inside a soap dispenser. Further, the soap consistency may also be pre-selected on the soap dispenser, the faucet or other equipment by a consistency selector 45.

It should be noted that the communication between the soap dispenser or the water amount controlling device or the aircraft hand washing device may be carried out on a wired base or a wireless base. In particular, the communication between the detection devices and the controller, the controller and the water faucet, or a water controlling valve may be carried out wired or wireless. Also the consistency selector may communicate with either of the detection units or the controller or the interface or the cabin management system by way of wired or wireless connection. The cabin management system 70 may communicate to ground services as well as cabin or service crew to indicate or communicate a required refill or maintenance of the water amount controlling device or aircraft hand washing device.

It should be noted that the invention may not only be applied to aircrafts, but also for ships, trains, busses, motor homes, etc.

It should be noted that the term "comprise" does not exclude other elements or steps, and the term "a" or "an" does not exclude a plurality. Also elements described in association with the different embodiments may be combined.

It should be noted that the reference signs in the claims shall not be construed as limiting the scope of the claims.

REFERENCE LIST 1 water amount controlling device
2 aircraft
3 water faucet
4 water controlling valve
10 control unit
20 washing agent receptacle
30 detection unit
31 consistency detector
32 amount detector/flow detector
33 fill level detector/weight detector
34 type identification unit
40 dispensing unit
45 consistency selector
50 washing agent container
55 mechanical property
56 electronic identifier
57 optical identifier
60 interface
70 cabin management system
100 aircraft hand washing device

The invention claimed is:

1. A water amount controlling device, comprising:
a control unit for controlling an amount of water to be supplied,
a washing agent receptacle including a detection unit,
wherein the detecting unit is adapted for detecting and identifying a property of a quantity of a washing agent dispensed from a washing agent reservoir to be received in the washing agent receptacle,
wherein the control unit is adapted for controlling an amount of water based on the detected and identified property of the quantity of the washing agent by controlling an opening cycle of a water controlling valve with respect to an opening grade, and
wherein the water is dispensed after the washing agent.

2. The water amount controlling device according to claim 1, further comprising a dispensing unit,
wherein the washing agent receptacle is adapted for receiving a washing agent container, and
wherein the dispensing unit is adapted for dispensing an amount of an washing agent out of a washing agent container upon user request.

3. The water amount controlling device according to claim 1, wherein the detection unit is adapted for detecting and identifying a consistency of a dispensed washing agent, and
wherein the control unit is adapted to control the amount of water based thereon.

4. The water amount controlling device according to claim 1, wherein the detection unit is adapted for detecting and identifying an amount of a dispensed washing agent, and
wherein the control unit is adapted to control the amount of water based thereon.

5. The water amount controlling device according to claim 1, wherein the detection unit is adapted for detecting and identifying a flow of a dispensed washing agent, and
wherein the control unit is adapted to control the amount of water based thereon.

6. The water amount controlling device according to claim 1, wherein the detection unit is adapted for detecting mechanical properties of a washing agent container to be received in the receptacle, the mechanical properties being unique for a property of the washing agent in the washing agent container.

7. The water amount controlling device according to claim 1, wherein the detection device is adapted for detecting an electronic identifier of a washing agent container to be received in the receptacle.

8. The water amount controlling device according to claim 1, wherein the detection device is adapted for detecting a weight of a washing agent container to be received in the receptacle for identifying a washing agent container.

9. The water amount controlling device according to claim 1, wherein the detection device is adapted for detecting a fill level of a washing agent container to be received in the washing agent receptacle.

10. The water amount controlling device according to claim 1, further comprising an interface to a cabin management system of an aircraft for providing information on a fill level of the washing agent container to be received in the washing agent receptacle for maintenance/service purposes.

11. An aircraft hand washing device, comprising:
a water amount controlling device;
a water faucet;
a water controlling valve;
wherein the control unit is adapted for controlling the water controlling valve so as to control an amount of water supplied by the water faucet;
wherein the water amount controlling device comprises:
a control unit for controlling an amount of water to be supplied,
a washing agent receptacle including a detection unit,
wherein the detecting unit is adapted for detecting and identifying a property of a quantity of washing agent dispensed from a washing agent reservoir to be received in the washing agent receptacle,
wherein the control unit is adapted for controlling an amount of water based on the detected and identified property of the quantity of washing agent by controlling an opening cycle of the water controlling valve with respect to an opening grade, and
wherein the water is dispensed after the washing agent.

12. The aircraft hand washing device according to claim 11, wherein the water amount controlling device is adapted to control an opening cycle of the water controlling valve with respect to an opening duration.

13. The aircraft hand washing device according to claim 11, wherein the water amount controlling device is adapted to control a water pressure of the water to be supplied to the water faucet.

14. The aircraft hand washing device according to claim 11, wherein the water amount controlling device is adapted to control a flow cross section of the water controlling valve for controlling the water pressure of the water to be supplied to the water faucet.

* * * * *